(12) United States Patent
Nakajima

(10) Patent No.: US 8,319,984 B2
(45) Date of Patent: Nov. 27, 2012

(54) IMAGE FORMING SYSTEM, APPARATUS, AND METHOD EXECUTING A PROCESS DESIGNATED BY A SERVICE REQUEST AFTER TOKEN VALIDATION

(75) Inventor: Kouki Nakajima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 992 days.

(21) Appl. No.: 12/349,807

(22) Filed: Jan. 7, 2009

(65) Prior Publication Data

US 2009/0251724 A1 Oct. 8, 2009

(30) Foreign Application Priority Data

Apr. 2, 2008 (JP) ................................. 2008-095684

(51) Int. Cl.
*G06F 21/00* (2006.01)
*G06F 15/16* (2006.01)
*G06F 3/12* (2006.01)
*H04L 9/32* (2006.01)

(52) U.S. Cl. ...... 358/1.14; 358/1.15; 709/229; 713/172; 713/185

(58) Field of Classification Search ........ 358/1.13–1.15, 358/400, 401, 434–442, 468; 709/223–229; 713/150–186; 340/5.2–5.86
See application file for complete search history.

(56) References Cited

U.S. PATENT DOCUMENTS

| | | |
|---|---|---|
| 2006/0062588 A1 | 3/2006 | Saka et al. |
| 2006/0233563 A1 | 10/2006 | Matsuhara |
| 2007/0223030 A1 | 9/2007 | Miyajima |
| 2007/0234400 A1* | 10/2007 | Yanagi ............................ 726/1 |
| 2007/0253014 A1 | 11/2007 | Nakata |
| 2007/0273913 A1* | 11/2007 | Nakata ......................... 358/1.14 |
| 2009/0207434 A1* | 8/2009 | Tanaka ......................... 358/1.14 |
| 2010/0017891 A1 | 1/2010 | Thierbach |
| 2010/0245885 A1* | 9/2010 | Selvaraj ....................... 358/1.15 |
| 2010/0265531 A1* | 10/2010 | Nitta ............................ 358/1.14 |

(Continued)

FOREIGN PATENT DOCUMENTS

JP   2006-085630   3/2006

(Continued)

OTHER PUBLICATIONS

Japanese Office Action 2008-095684 dated Jun. 26, 2012, 4 pages.

*Primary Examiner* — Scott A Rogers
(74) *Attorney, Agent, or Firm* — K&L Gates LLP

(57) ABSTRACT

An image forming system includes a terminal apparatus and an image forming apparatus executing a process in response to a request from the terminal apparatus. The terminal apparatus sends user identification information to the image forming apparatus, receives from the image forming apparatus a token issued to a user logging into the image forming apparatus, and sends a service request associated with the token to the image forming apparatus. The image forming apparatus includes a network processing unit that communicates data using a predetermined protocol with the terminal apparatus; a login processing unit that permits the user to log in when the user identification information is valid and sends the token to the terminal apparatus; a determination unit that determines whether the token is valid upon receipt of the service request; and a service providing unit that executes a process designated by the service request when the token is valid.

15 Claims, 12 Drawing Sheets

U.S. PATENT DOCUMENTS

2011/0067090 A1* 3/2011 Osaki .............................. 726/4
2011/0122439 A1* 5/2011 Sato et al. .................... 358/1.15

FOREIGN PATENT DOCUMENTS

| | | |
|---|---|---|
| JP | 2006-293742 | 10/2006 |
| JP | 2006-295716 | 10/2006 |
| JP | 2007-053778 | 3/2007 |
| JP | 2007-065917 | 3/2007 |
| JP | 2007-128208 | 5/2007 |
| JP | 2007-266698 | 10/2007 |
| JP | 2007-293703 | 11/2007 |
| JP | 2008-033583 | 2/2008 |
| WO | 2007/039048 | 4/2007 |

\* cited by examiner

IMAGE FORMING SYSTEM, APPARATUS, AND METHOD EXECUTING A PROCESS DESIGNATED BY A SERVICE REQUEST AFTER TOKEN VALIDATION

INCORPORATION BY REFERENCE

This application is based upon and claims the benefit of priority from the corresponding Japanese Patent Application No. 2008-095684, filed Apr. 2, 2008, the entire contents of which is incorporated herein by reference.

BACKGROUND

1. Field of the Invention

The present invention relates to image forming systems, image forming apparatuses, and image forming methods.

2. Description of the Related Art

In image forming apparatuses such as multifunction peripheral (MFP) and copiers, when a user enters a user ID through the operation panel of the apparatus, the apparatus queries an authentication server as to the validity of the user ID and permits the user to log in on the basis of a response to the query.

Recently, it is possible to send a request from a terminal apparatus, such as a personal computer via a computer network, to an image forming apparatus and cause the image forming apparatus to execute a process designated by the request.

However, since the above-described user authentication method assumes that the user ID is to be entered by directly operating the image forming apparatus, it is difficult to apply the method to a system wherein the user uses the image forming apparatus from the terminal apparatus via the computer network.

SUMMARY

The present invention provides image forming systems, image forming apparatuses, and image forming methods that make it possible to reliably perform user authentication and authorization in a system wherein a user uses the image forming apparatus from a terminal apparatus via a computer network.

An image forming system according to an embodiment of the present invention comprises a terminal apparatus and an image forming apparatus that executes a process in response to a request from the terminal apparatus. The terminal apparatus sends user identification information to the image forming apparatus, receives from the image forming apparatus a token issued to a user who has logged into the image forming apparatus, and sends a service request in association with the token to the image forming apparatus. The image forming apparatus includes: a network processing unit that performs data communication using a predetermined protocol with the terminal apparatus; a login processing unit that permits the user to log in when the user identification information received by the network processing unit from the terminal apparatus is valid and sends the token to the terminal apparatus; a determination unit that determines, when the network processing unit receives the service request associated with the token, whether the token is a valid token; and a service providing unit that executes a process designated by the service request when it is determined by the determination unit that the token is a valid token.

An image forming apparatus according to an another embodiment of the present invention is an image forming apparatus that executes a process in response to a request from a terminal apparatus, comprising: a network processing unit that performs data communication using a predetermined protocol with the terminal apparatus; a login processing unit that permits a user to log in when user identification information received by the network processing unit from the terminal apparatus is valid user identification information and sends to the terminal apparatus a token for the user who has logged in; a determination unit that determines, when the network processing unit receives a service request associated with the token, whether the token is a valid token; and a service providing unit that executes a process designated by the service request when it is determined by the determination unit that the token is a valid token.

An image forming method according to yet another embodiment of the present invention is an image forming method of executing a process in response to a request from a terminal apparatus, comprising the steps of: permitting a user to log in when user identification information received from the terminal apparatus is valid user identification information and sending to the terminal apparatus a token for the user who has logged in; determining, upon receipt of a service request associated with the token, whether the token is a valid token; and executing a process designated by the service request when it is determined that the token is a valid token.

Additional features and advantages are described herein, and will be apparent from the following Detailed Description and the figures.

BRIEF DESCRIPTION OF THE FIGURES

FIG. 3 is a block diagram illustrating the structure of processing units realized by executing, with a computer shown in FIG. 2, an image forming program and the like;

DETAILED DESCRIPTION

An embodiment of the present invention will now herein be described with reference to the drawings.

Figure 1:
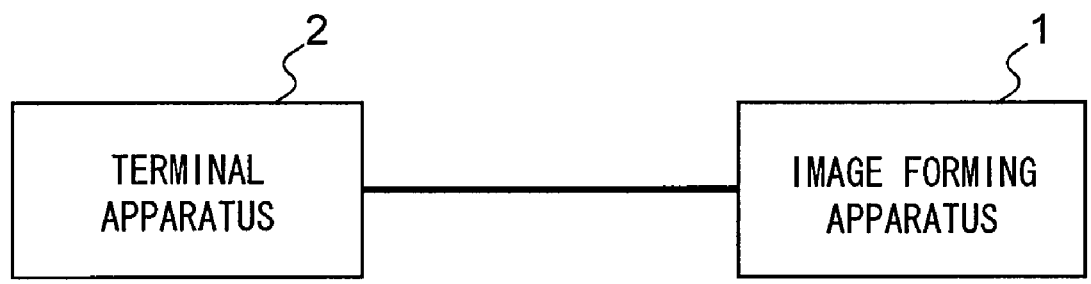
FIG. 1 is a block diagram illustrating the configuration of an image forming system according to an embodiment of the present invention.

FIG. 1 is a block diagram illustrating the configuration of an image forming system according to an embodiment of the present invention. Referring to FIG. 1, an image forming apparatus 1 is an apparatus that executes processes, such as an image forming process and an image data sending/receiving process, in response to requests from a terminal apparatus 2. It is assumed that the form of the image forming apparatus 1 is a MFP, a copier, a facsimile sending/receiving machine, or the like. The terminal apparatus 2 is an apparatus that establishes connection to the image forming apparatus 1 via a computer network, sends service requests to the image forming apparatus 1 to cause the image forming apparatus 1 to execute various processes, and receives the results of the processes. The terminal apparatus 2 can be a personal computer or the like in which a predetermined application program, utility program, driver program, and the like are installed. In this system, after the terminal apparatus 2 establishes connection to the image forming apparatus 1 via a communication channel, a user who wishes to use the image forming apparatus 1 from the terminal apparatus 2 is required to be authenticated by the image forming apparatus 1.

Figure 2:
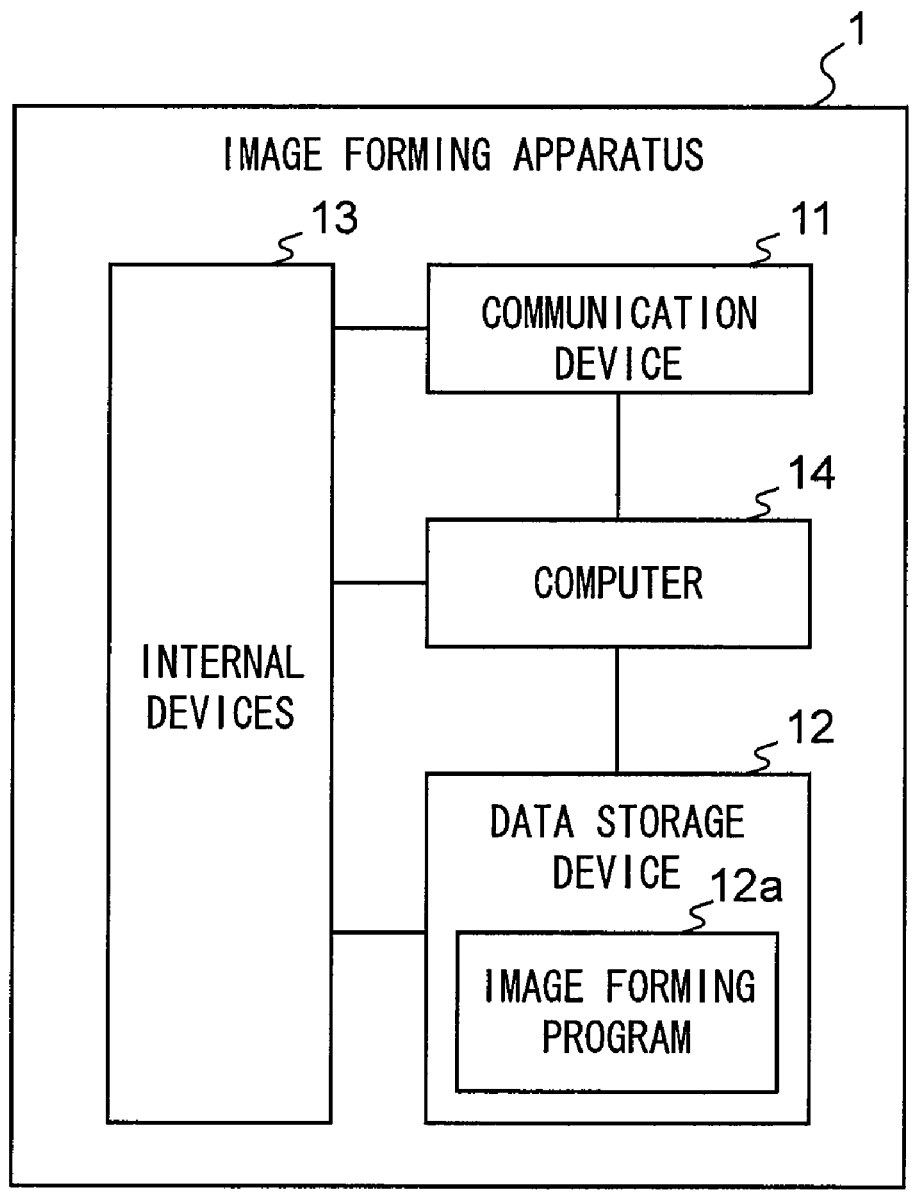
FIG. 2 is a block diagram illustrating the structure of an image forming apparatus shown in FIG. 1.

FIG. 2 is a block diagram illustrating the structure of the image forming apparatus 1 shown in FIG. 1. Referring to FIG. 2, a communication device 11 is a device that can perform data communication with the terminal apparatus 2 via a computer network or the like. A network interface, for example, can be used as the communication device 11. A data storage device 12 is a device that stores an image forming program 12a, other computer programs, and data needed for an image forming process and the like. A hard disk drive or a non-volatile memory, for example, is used as the data storage device 12.

Internal devices 13 are devices required to achieve features of the image forming apparatus 1. A scanner, a printer, and a modem, for example, are provided, as needed, as the internal devices 13. In addition, the communication device 11 is additionally included in the internal devices 13 when image data is to be sent/received via the computer network.

A computer 14 is a processing unit that includes a central processing unit (CPU), a read only memory (ROM), a random access memory (RAM), and the like, all of which are not shown in the drawings. The computer 14 executes the image forming program 12a and the like stored in the data storage device 12 to realize various processing units.

Figure 3:
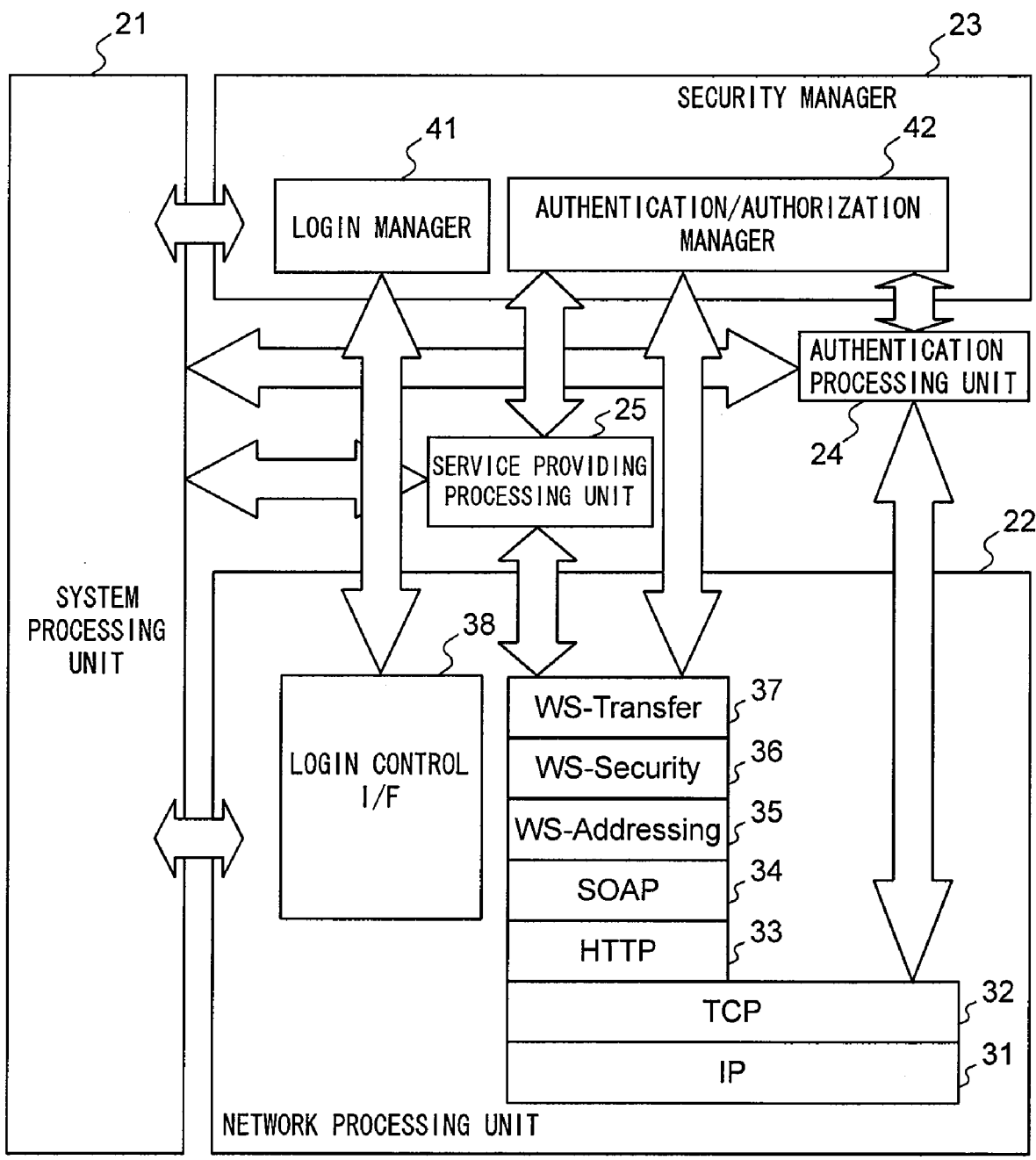

FIG. 3 is a block diagram illustrating the structure of processing units realized by executing, with the computer 14 shown in FIG. 2, the image forming program 12a and the like. Referring to FIG. 3, a system processing unit 21 is a processing unit that controls and/or monitors the internal devices 13. A network processing unit 22 includes entities 31 through 37 that perform communication processes using various protocols and a login control interface 38. In the illustrated embodiment, the entity 31 performs Internet Protocol (IP) processing, the entity 32 performs Transmission Control Protocol (TCP) processing, the entity 33 performs HyperText Transfer Protocol (HTTP) server and client processing, and the entity 34 performs HTTP-based Simple Object Access Protocol (SOAP) proxy and listener processing.

Referring now to the entity 35, it performs the process of managing an end point (that is, network identification information and other attribute information of the terminal apparatus 2) on the basis of SOAP-based Web Services Addressing (WS-Addressing). Note that the WS-Addressing specification is defined by the Word Wide Web Consortium (W3C).

The entity 36 sends/receives information needed for authentication and authorization on the basis of SOAP-based Web Services Security (WS-Security) and WS-Security appendices. The WS-Security and WS-Security appendices define the UserNameToken element including identification information of the sender as a security token. Further, the WS-Security and WS-Security appendices define the Binary-SecurityToken element including certificate information of the sender as a binary security token. The security token and the binary security token are included in a SOAP header.

The entity 37 sends/receives information on the basis of SOAP-based Web Services Transfer (WS-Transfer). Note that the WS-Transfer specification is defined by W3C.

The login control interface 38 obtains user identification information related to a login request of the user, from information received from the terminal apparatus 2 and supplies the user identification information thereby obtained to a security manager 23. For example, when user identification information including the user ID and password is received as a security token from the terminal apparatus 2, the user identification information is extracted from the security token extracted by the entity 36.

Also, the security manager 23 includes a login manager 41 and an authentication/authorization manager 42. For example, the login manager 41 provides login permission to a user, and issues a user token for the user who has logged in. The authentication/authorization manager 42 performs processing to authenticate the user token (i.e., to authorize the user) at the time of a service request and authorize the user to use a feature of the system processing unit 21, for example.

An authentication processing unit 24 provides a request for authentication processing to an external authentication server via the network processing unit 22 using various protocols and outputs an authentication result obtained by the external authentication server. The authentication processing unit 24 is configured as a module independent of the system processing unit 21, the network processing unit 22, the security manager 23, and the like. The authentication processing unit 24 performs socket-based communication, for example, with the system processing unit 21, the network processing unit 22, and the security manager 23. The authentication processing unit 24 uses an authentication protocol such as Kerberos, Lightweight Directory Access Protocol (LDAP), Windows NT Local Area Network (LAN) Manager authentication (NTLM) v1, or NTLMv2, as necessary. Also, the authentication processing unit 24 can easily change the authentication protocol since the authentication processing unit 24 has been configured as a module.

A service providing processing unit 25 is a processing unit that provides an image forming process, a data sending/receiving process, and other associated processes through Web services in response to service requests. "Web services" refer to the technology using SOAP as a communication protocol and Web Services Description Language (WSDL) and the like as a description language.

It should be noted that: the network processing unit 22 is an example of a network processing unit; the login manager 41 is an example of a login processing unit; the authentication/authorization manager 42 is an example of a determination unit; and the service providing processing unit 25 is an example of a service providing unit. Also, the authentication processing unit 24 is an example of an authentication processing unit and the system processing unit 21 is an example of a system processing unit.

Next, an embodiment of the operation of individual apparatuses in the foregoing system will be described.

Figure 4:
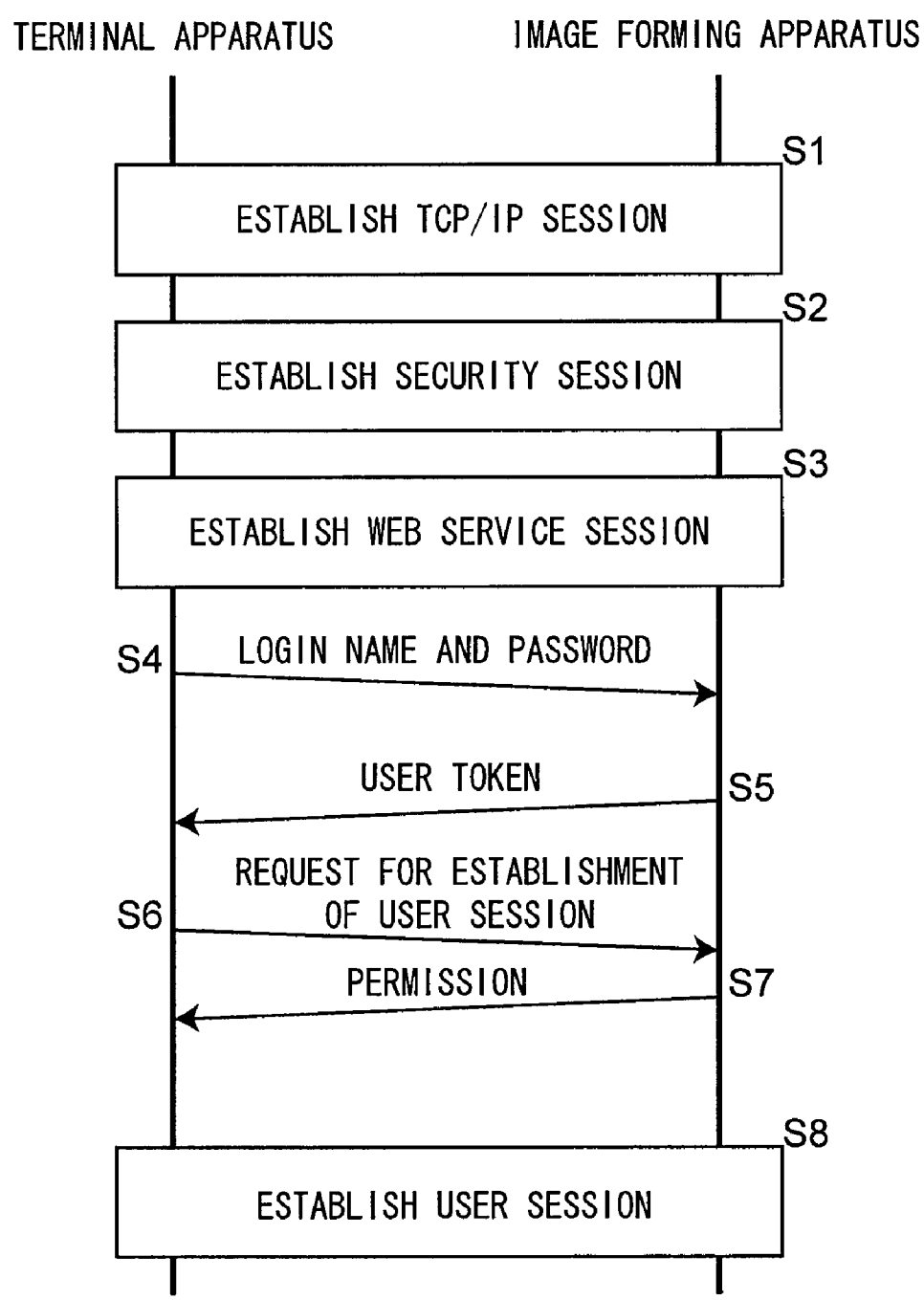
FIG. 4 is a chart illustrating sessions established between a terminal apparatus and the image forming apparatus in the system shown in FIG. 1.

FIG. 4 is a chart illustrating sessions established between the terminal apparatus 2 and the image forming apparatus 1 in the system shown in FIG. 1.

First, a TCP/IP session is established between the terminal apparatus 2 and the image forming apparatus 1 (step S1). In the image forming apparatus 1, the entities 31 and 32 perform processing for establishing the TCP/IP session.

Next, a security session is established between the terminal apparatus 2 and the image forming apparatus 1 on the basis of HyperText Transfer Protocol Security (HTTPS), mutual authentication of the image forming apparatus 1 and the terminal apparatus 2, and the like (step S2). In the image forming apparatus 1, the entity 33 performs processing for establishing the security session. Accordingly, the validity of the image forming apparatus 1 and the terminal apparatus 2 and the security of a communication channel between the image forming apparatus 1 and the terminal apparatus 2 are provided.

Then, a Web service session is established between the terminal apparatus 2 and the image forming apparatus 1 (step S3). In the image forming apparatus 1, the entity 35 recognizes the terminal apparatus 2 as an end point. Thereafter, notifications, requests, and responses relating to Web services are sent/received in accordance with SOAP.

When the Web service session is established, the terminal apparatus 2 sends, together with a login request, user identification information to the image forming apparatus 1, and the image forming apparatus 1 receives the user identification information (step S4). The user identification information is information for identifying the user operating the terminal apparatus 2 and includes, for example, a user ID, a set of a user ID and password, or biometric information (e.g., fingerprint information) of the user. Upon receipt of the user identification information, the image forming apparatus 1 determines the validity of the user identification information or queries an external authentication server as to the validity of the user identification information. Then, the image forming apparatus 1 determines whether or not the user identification information is valid.

If the user identification information is valid, the image forming apparatus 1 generates a user token for the user of the user identification information, stores the user token in association with the user identification information, and sends the user token to the terminal apparatus 2. The terminal apparatus 2 receives the user token, together with login permission as a response to the login request (step S5). The terminal apparatus 2 stores the user identification information and the user token in association with each other. At the time of a subsequent service request, the terminal apparatus 2 presents the user identification information and the user token to the image forming apparatus 1. The user token is data having a value unique to the login of the user. Therefore, single sign-on is realized. That is, the user token that is issued is used only for a period in which the previous login is effective.

Subsequently, when the terminal apparatus 2 sends a service request for a Web service to the image forming apparatus 1, the terminal apparatus 2 includes the user token in the service request (step S6). The image forming apparatus 1 determines the validity of the user token and, when the user token is valid, allows service (step S7). Accordingly, a user session for providing the service is established on a Web service between the image forming apparatus 1 and the terminal apparatus 2 (step S8).

In this manner, when the terminal apparatus 2 sends a service request to the image forming apparatus 1, user authorization is always performed on the basis of a user token.

Next, embodiments of processes performed between the terminal apparatus 2 and the image forming apparatus 1 will be described with regard to the following items:
(a) Login process
(b) Logout process
(c) Process of saving the value of an attribute (setting item) of a system feature of the image forming apparatus 1 (hereinafter referred to as an attribute value saving process)

(d) Process of setting authorization for the system feature of the image forming apparatus 1 (hereinafter referred to as an authorization setting process)
(e) Process of browsing authorization information set for the system feature of the image forming apparatus 1 (hereinafter referred to as an authorization information browsing process)
(f) Process based on a service request from the terminal apparatus 2 (hereinafter referred to as a Web service process)

Figure 5:
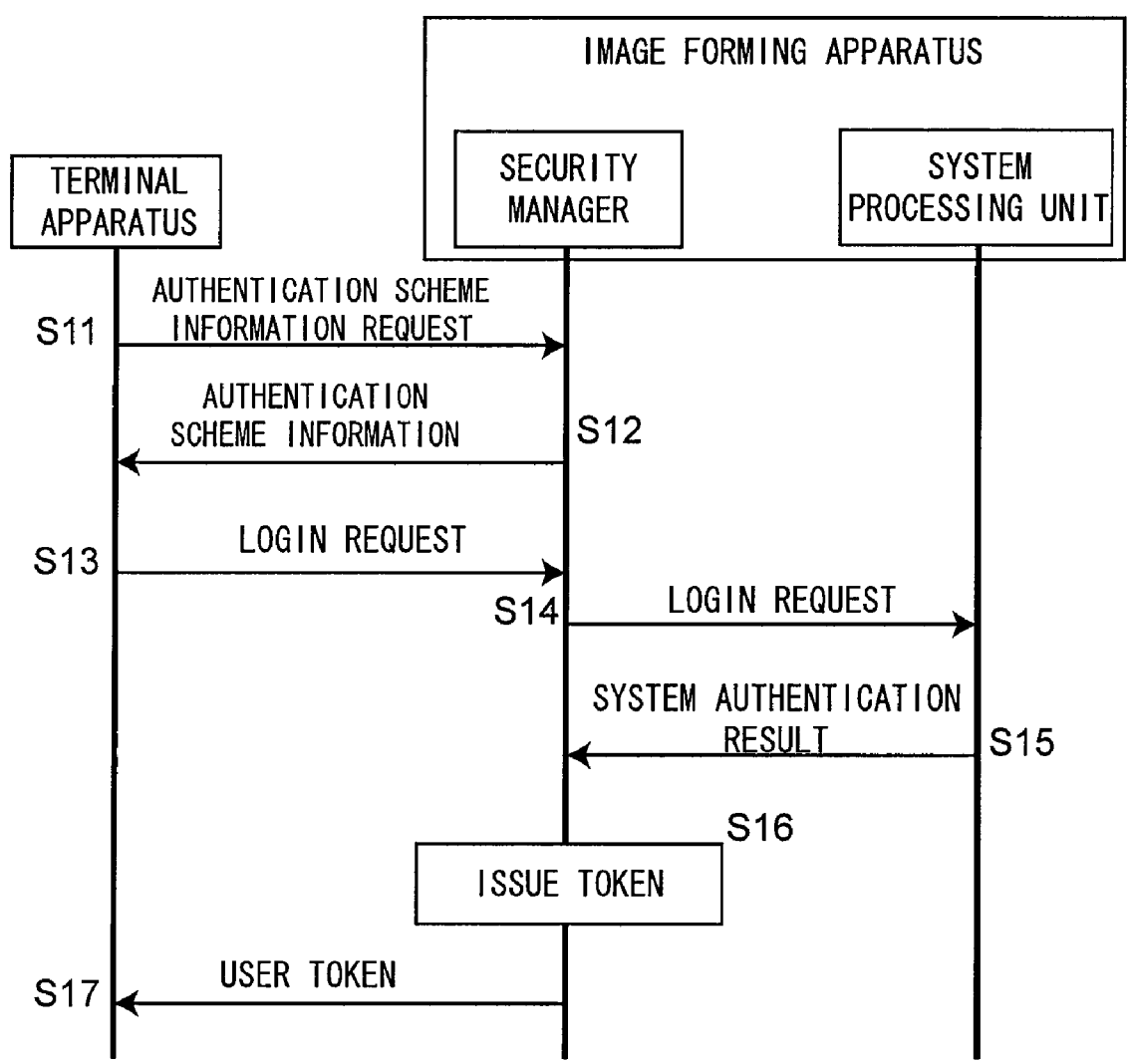
FIG. 5 is a chart illustrating a login process in the system shown in FIG. 1.
Figure 6:
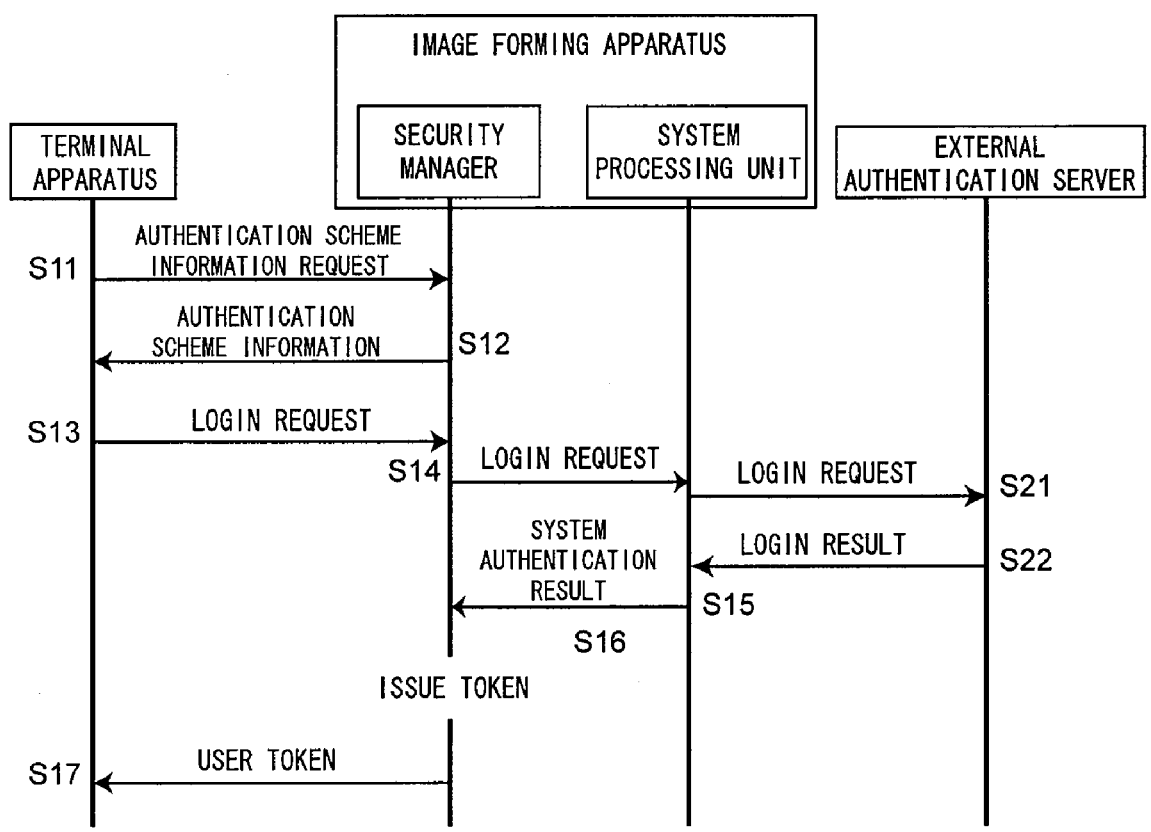
FIG. 6 is a chart illustrating a login process in the system shown in FIG. 1, using an external authentication server.

Details of Individual Processes
(a) Login Process
FIG. 5 is a chart illustrating a login process in the system shown in FIG. 1. FIG. 6 is a chart illustrating a login process in the system shown in FIG. 1, using an external authentication server.

After the TCP/IP session, security session, and Web service session are established as illustrated in FIG. 4, the terminal apparatus 2 sends an authentication scheme information request to the image forming apparatus 1 in order to specify a user authentication scheme of the image forming apparatus 1 (step S11). In this embodiment, the authentication scheme information request is sent as a SOAP envelope written in WSDL. Also, the SOAP envelope includes a security token or binary security token of WS-Security. The security token or the binary security token includes a certificate (Kerberos ticket, X.509v3 certificate, or the like) of the image forming apparatus 1, the Media Access Control (MAC) address of the image forming apparatus 1, information unique to a program, such as a utility program, application program, or driver program in the terminal apparatus 2 which executes the login process. The image forming apparatus 1 receives the authentication scheme information request. In the image forming apparatus 1, the entities 31 through 36 execute processes in accordance with the respective protocols, and the entity 36 extracts the security token or the binary security token from the SOAP envelope of the request. The login control interface 38 in turn supplies the token to the login manager 41. In response to the authentication scheme information request, the login manager 41 includes the authentication scheme information providing a user authentication method allowed by the login manager 41 in response to the request. And the login manager 41 sends the response via the network processing unit 22 to the terminal apparatus 2 (step S12). The response is sent as an SOAP envelope as well.

Upon receipt of the response, the terminal apparatus 2 sends, together with the user identification information, a login request to the image forming apparatus 1 in accordance with the authentication scheme designated by the image forming apparatus 1 (step S13). The terminal apparatus 2 includes the security token including the user identification information in a SOAP header and sends the login request written in WSDL as a SOAP envelope. The image forming apparatus 1 receives the login request, together with the user identification information. In the image forming apparatus 1, the entities 31 through 36 execute processes in accordance with the respective protocols, and the entity 36 extracts the security token from the SOAP envelope of the login request. The login control interface 38 extracts the user identification information from the security token and supplies the user identification information to the login manager 41.

Upon receipt of the user identification information, the login manager 41 presents the user identification information to the system processing unit 21 and queries the system processing unit 21 as to whether to permit the user to log in or not (step S14). When user registration information is present in the image forming apparatus 1, the system processing unit 21 determines whether the user identification information is valid or not on the basis of the user registration information. In contrast, when no user registration information is present in the image forming apparatus 1, the system processing unit 21 causes the authentication processing unit 24 to send a query to the external authentication server (which is not illustrated in the drawings). The authentication processing unit 24 presents, using a protocol designated in advance, the user identification information to the external authentication server, queries the external authentication server as to the validity of the user identification information (step S21 in FIG. 6). And the authentication processing unit 24 receives the authentication result from the external authentication server (step S22 in FIG. 6). On the basis of the authentication result received by the authentication processing unit 24, the system processing unit 21 determines whether or not the user identification information is valid.

Then, the system processing unit 21 supplies the authentication result, indicating whether the user identification information is valid or not, to the login manager 41 (step S15).

If the user identification information is valid, the login manager 41 permits the user of the terminal apparatus 2 who has sent the user identification information to log in, and issues a user token to the user (step S16). The user token will be included in a security token or binary security token of WS-Security in a subsequent user session established for Web service communication. The login manager 41 stores the user token and the user identification information in association with each other.

When the login manager 41 permits the user to log in, the login manager 41 includes, via the network processing unit 22, the user token in a response to the login request and sends the response to the terminal apparatus 2 (step S17). At this time, the login manager 41 supplies the user token to the network processing unit 22. The network processing unit 22 includes the user token in a SOAP envelope of the response to the login request, and sends the SOAP envelope to the terminal apparatus 2. The user token may be included in either the header or body of the SOAP envelope.

Upon receipt of the response, when login is permitted, the terminal apparatus 2 extracts the user token from the SOAP envelope and stores the user token.

Note that, when a login is not permitted, the login manager 41 sends a response indicating a login denial to the terminal apparatus 2. When a login is denied, no user token is issued.

The login process is executed in the above-described manner.

(b) Logout Process

Figure 7:
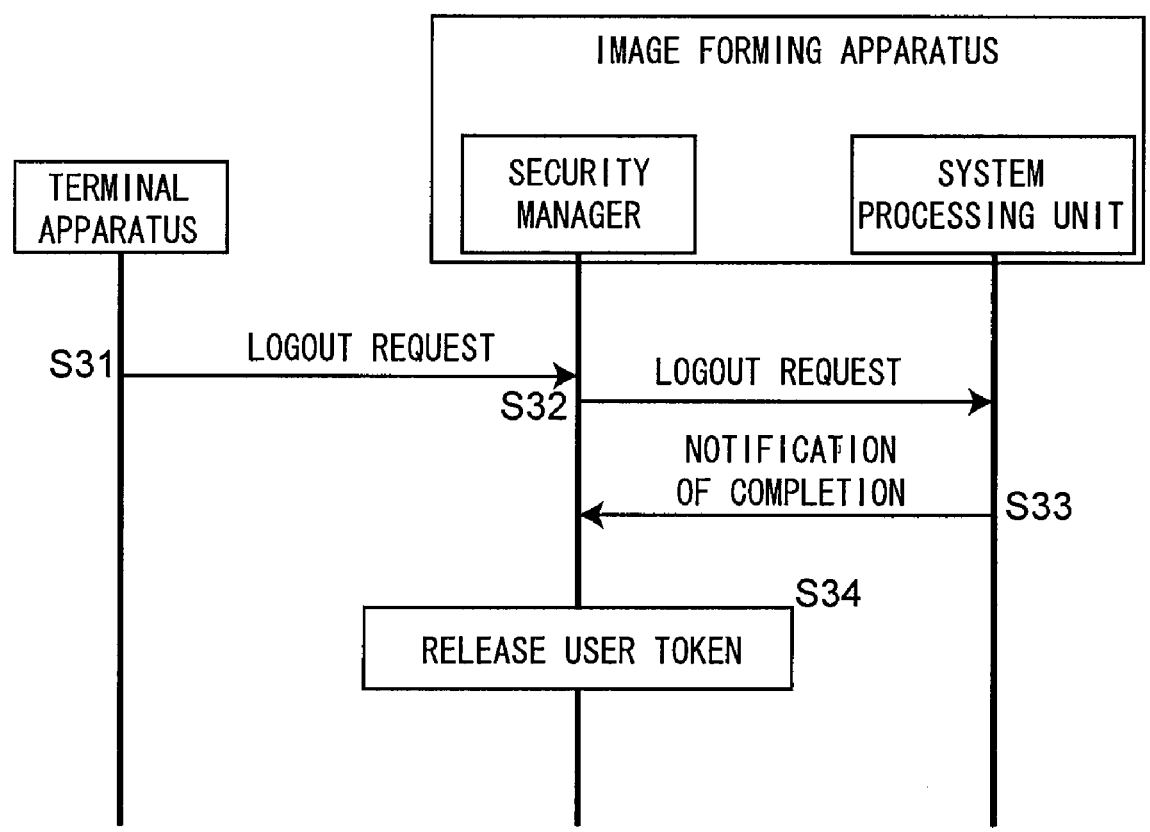
FIG. 7 is a chart illustrating a logout process in the system shown in FIG. 1.
Figure 8:
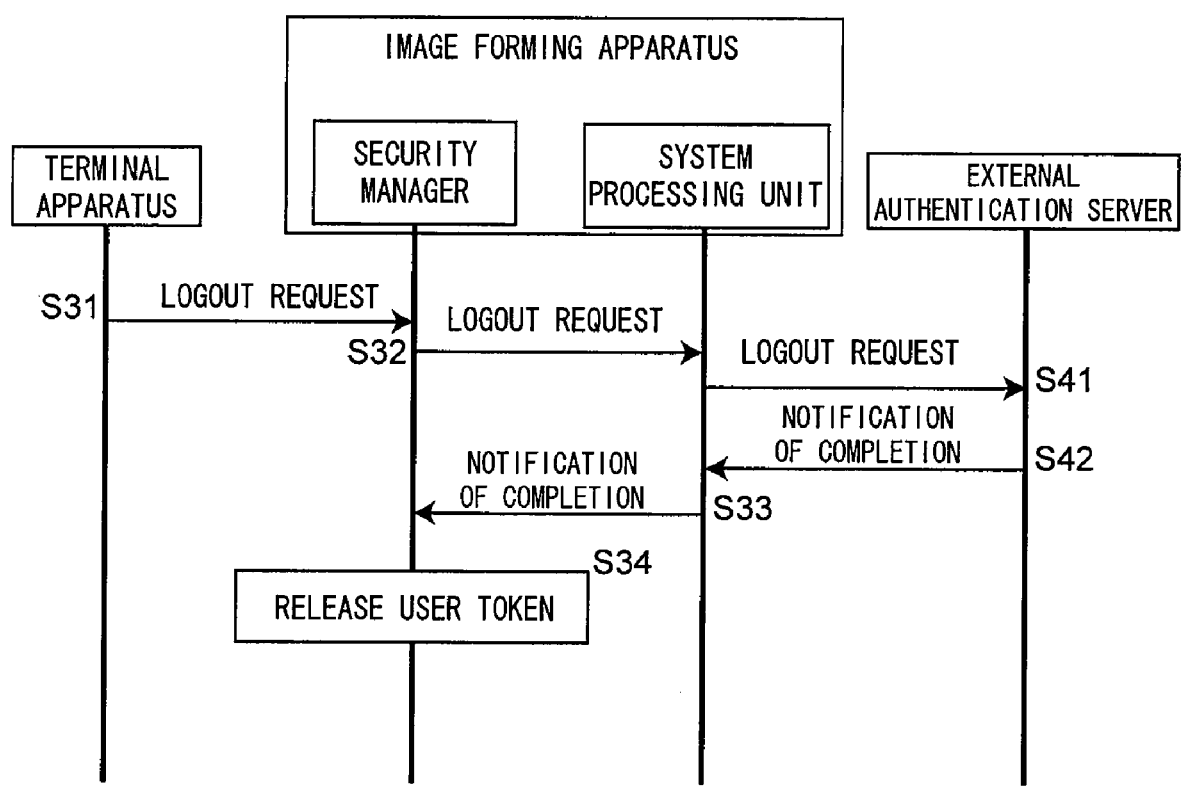
FIG. 8 is a chart illustrating a logout process in the system shown in FIG. 1, using the external authentication server.

FIG. 7 is a chart illustrating a logout process in the system shown in FIG. 1. FIG. 8 is a chart illustrating a logout process in the system shown in FIG. 1, using the external authentication server.

After the login process illustrated in FIG. 5 or 6, the terminal apparatus 2 sends a logout request to the image forming apparatus 1 on the basis of a user operation or the like (step S31). The terminal apparatus 2 sends a logout request which includes a user token and is written in WSDL as a SOAP envelope. The image forming apparatus 1 receives the logout request. In the image forming apparatus 1, the entities 31 through 36 execute processes in accordance with the respective protocols, and the entity 36 extracts the user token from the SOAP envelope of the logout request. The user token is included in a security token or binary security token in a SOAP header. The authentication/authorization manager 42 supplies the extracted user token to the login manager 41.

Upon receipt of the user token, the login manager 41 verifies the user token and, when the user token is valid, presents the user identification information associated with the user token to the system processing unit 21 to make a logout request (step S32). When user registration information is present in the image forming apparatus 1, the system processing unit 21 performs a logout process for the user of the user identification information on the basis of the user registration information and supplies a notification of completion to the login manager 41 (step S33). In contrast, when no user registration information is present in the image forming apparatus 1, the system processing unit 21 causes the authentication processing unit 24 to make a logout request to the external authentication server (which is not illustrated in the drawings). The authentication processing unit 24 presents, using a protocol designated in advance, the user identification information to the external authentication server, sends a logout request including the user identification information to the external authentication server (step S41 in FIG. 8). And the authentication processing unit 24 receives a notification of completion of the logout process from the external authentication server (step S42 in FIG. 8). Upon receipt of the notification of completion from the authentication processing unit 24, the system processing unit 21 supplies the notification of completion to the login manager 41 (step S33).

Upon receipt of the notification of completion of the logout process relating to the user identification information from the system processing unit 21, the login manager 41 stops storing the user token that is being stored in association with the user identification information, and releases the user token (step S34).

The logout process is executed in the above-described manner.

(C) Attribute Value Saving Process

Figure 9:
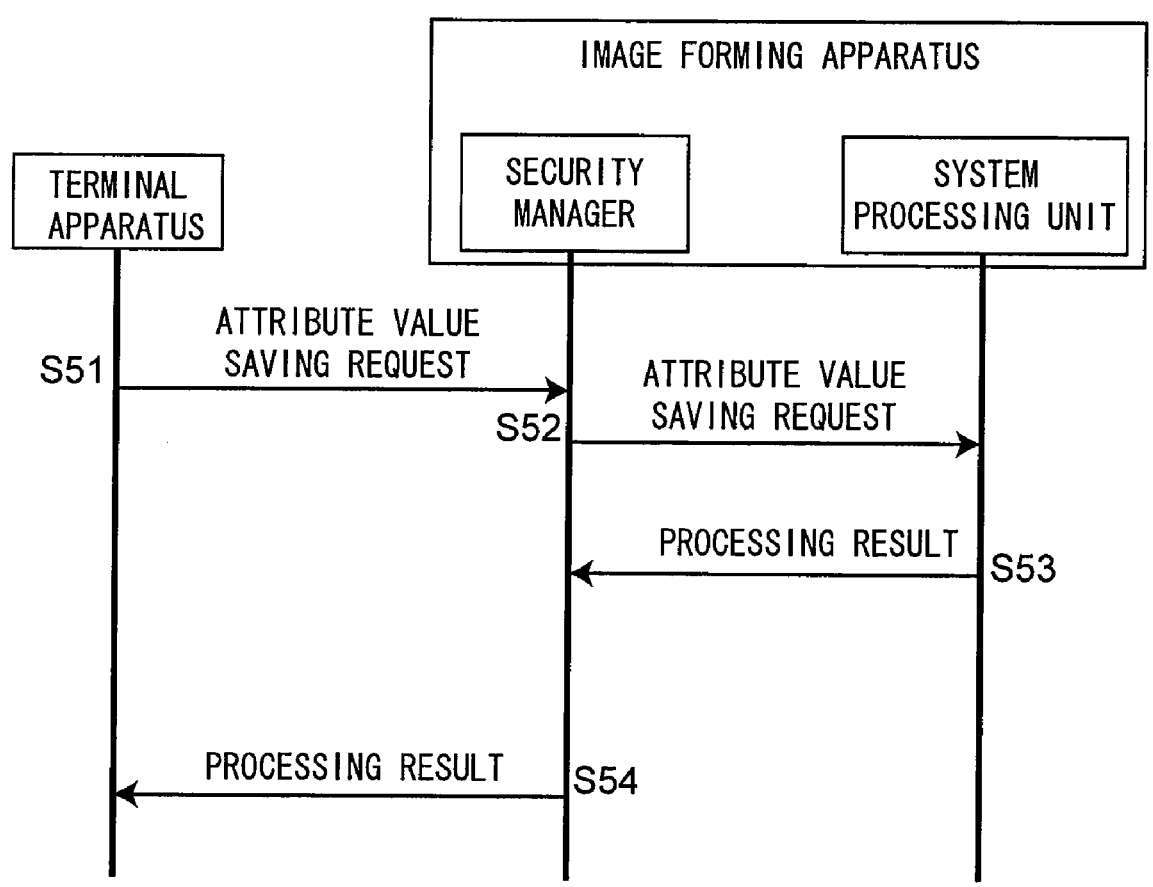
FIG. 9 is a chart illustrating an attribute value changing process in the system shown in FIG. 1.

FIG. 9 is a chart illustrating an attribute value saving process in the system shown in FIG. 1.

After the login process illustrated in FIG. 5 or 6, the terminal apparatus 2 sends an attribute value saving request to the image forming apparatus 1 on the basis of a user operation or the like (step S51). The terminal apparatus 2 includes a user token in a SOAP header and sends an attribute value saving request written in WSDL as a SOAP envelope. The attribute value saving request includes the type and value of an attribute (setting item). The image forming apparatus 1 receives the attribute value saving request. In the image forming apparatus 1, the entities 31 through 36 execute processes in accordance with the respective protocols, and the entity 36 extracts the user token from the SOAP envelope of the attribute value saving request. The user token is included in a security token or binary security token in the SOAP header. The authentication/authorization manager 42 supplies the extracted user token to the login manager 41.

Upon receipt of the user token, the login manager 41 verifies the user token and, when the user token is valid, presents the user identification information associated with the user token to the system processing unit 21 to request the attribute value be saved in accordance with the request from the terminal apparatus 2 (step S52). In accordance with the request, the system processing unit 21 saves the attribute value. Note that, when the value of the designated attribute already exists, the system processing unit 21 updates the value of the attribute to the value designated by the request. Accordingly, the attribute value is reflected in processing in the system processing unit 21.

When the saving of the attribute value is completed, the system processing unit 21 supplies the processing result (whether the saving was successful or not) to the login manager 41 (step S53).

Upon receipt of the processing result from the system processing unit 21, the login manager 41 sends the processing result via the network processing unit 22 to the terminal apparatus 2 (step S54). Then, the network processing unit 22 sends a response to the attribute value saving request, which includes the processing result, as a SOAP envelope. The terminal apparatus 2 receives the response to the attribute value saving request.

The attribute value saving process is executed in the above-described manner.

(d) Authorization Setting Process

Figure 10:
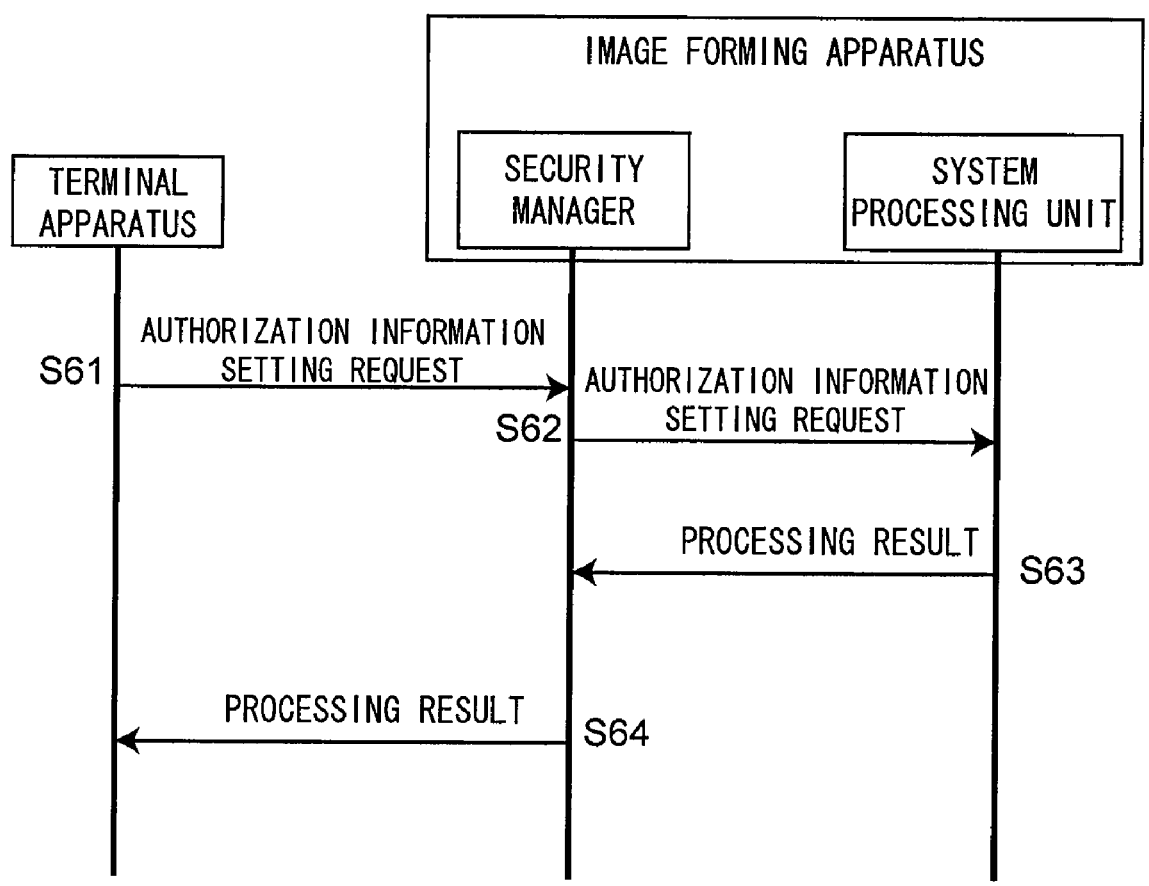
FIG. 10 is a chart illustrating an authorization setting process in the system shown in FIG. 1.

FIG. 10 is a chart illustrating an embodiment of the authorization setting process in the system shown in FIG. 1.

After the login process illustrated in FIG. 5 or 6, the terminal apparatus 2 sends an authorization information setting request to the image forming apparatus 1 on the basis of a user operation or the like (step S61). The terminal apparatus 2 includes a user token in a SOAP header and sends an authorization information setting request written in WSDL as a SOAP envelope. The authorization information setting request includes authorization information indicating the name of a feature (e.g., the name of a function) for which authorization will be sought. The image forming apparatus 1 receives the authorization information setting request. In the image forming apparatus 1, the entities 31 through 36 execute processes in accordance with the respective protocols, and the entity 36 extracts the user token from the SOAP envelope of the authorization information setting request. The user token is included in a security token or binary security token in the SOAP header. The authentication/authorization manager 42 supplies the extracted user token to the login manager 41.

Upon receipt of the user token, the login manager 41 verifies the user token and, when the user token is valid, presents the user identification information associated with the user token to the system processing unit 21 to request the authorization information be set in accordance with the request from the terminal apparatus 2 (step S62). In accordance with the request, the system processing unit 21 sets the authorization information.

When the setting of the authorization information is completed, the system processing unit 21 supplies the processing result (whether the setting was successful or not) to the login manager 41 (step S63).

Upon receipt of the processing result from the system processing unit 21, the login manager 41 sends the processing result via the network processing unit 22 to the terminal apparatus 2 (step S64). At this time, the network processing unit 22 sends a response to the authorization information setting request, which includes the processing result, as a SOAP envelope. The terminal apparatus 2 receives the response to the authorization information setting request.

The authorization setting process is executed in the above-described manner. Note that the authorization setting process may be adapted to be executable only by a user who has predetermined authority. In that case, user identification information of a user who has predetermined authority is stored in advance in the image forming apparatus 1. The login manager 41 causes the system processing unit 21 to execute an authorization setting process only when user identification information included in a login request is of the user who has predetermined authority. Note that the user who has predetermined authority may set authorization of another user.

(e) Authorization Information Browsing Process

Figure 11:
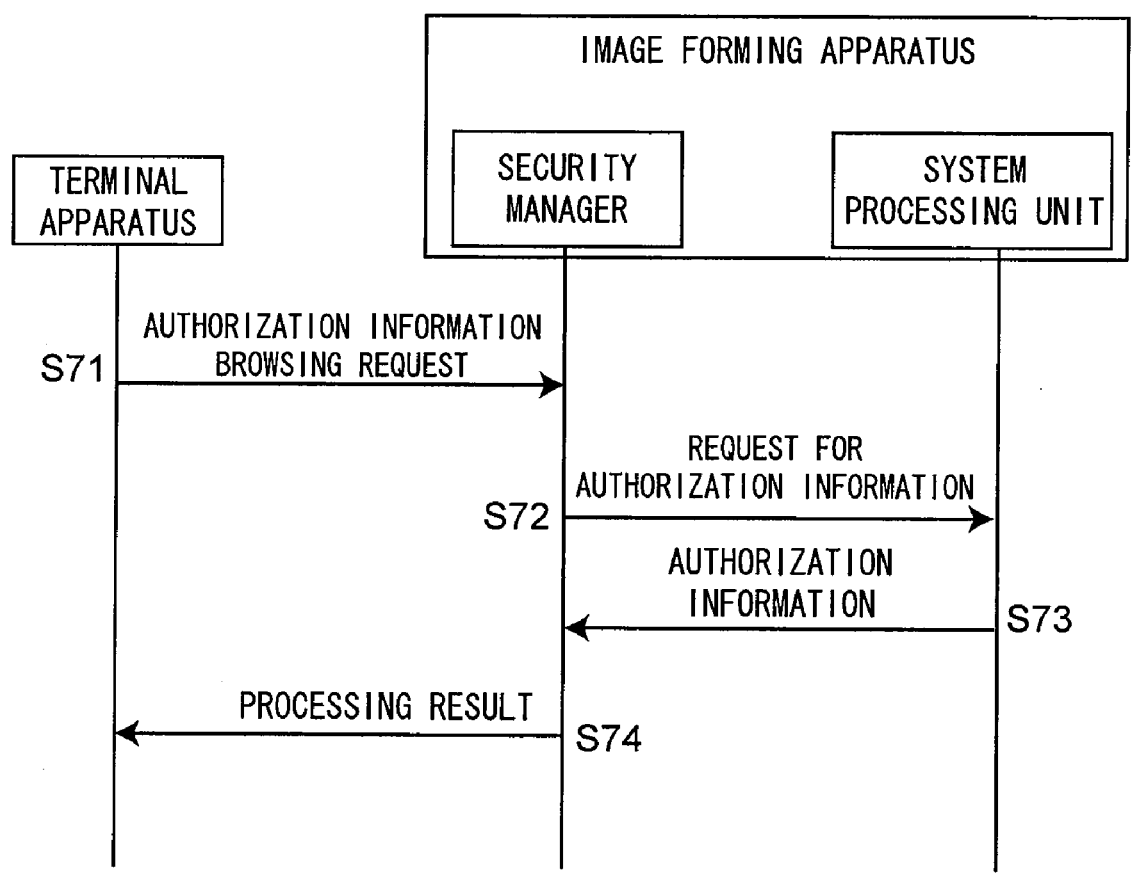
FIG. 11 is a chart illustrating an authorization information browsing process in the system shown in FIG. 1.

FIG. 11 is a chart illustrating an embodiment of an authorization information browsing process in the system shown in FIG. 1.

After the login process illustrated in FIG. 5 or 6, the terminal apparatus 2 sends an authorization information browsing request to the image forming apparatus 1 on the basis of a user operation or the like (step S71). The terminal apparatus 2 includes a user token in a SOAP header and sends an authorization information browsing request written in WSDL as a SOAP envelope. The image forming apparatus 1 receives the authorization information browsing request. In the image forming apparatus 1, the entities 31 through 36 execute processes in accordance with the respective protocols, and the entity 36 extracts the user token from the SOAP envelope of the authorization information browsing request. The user token is included in a security token or binary security token in the SOAP header. The authentication/authorization manager 42 supplies the extracted user token to the login manager 41.

Upon receipt of the user token, the login manager 41 verifies the user token and, if the user token is valid, presents the user identification information associated with the user token to the system processing unit 21 to request the authorization information be provided in accordance with the request from the terminal apparatus 2 (step S72). In accordance with the request, the system processing unit 21 supplies the authorization information set in the system processing unit 21. The authorization information includes the authorized feature and the user identification information.

When browsing of the authorization information is completed, the system processing unit 21 supplies the processing result (whether the browsing was successful or not and the obtained authorization information) to the login manager 41 (step S73).

Upon receipt of the processing result from the system processing unit 21, the login manager 41 sends the processing result via the network processing unit 22 to the terminal apparatus 2 (step S74). At this time, the network processing unit 22 sends a response to the authorization information browsing request, which includes the processing result, as a SOAP envelope. The terminal apparatus 2 receives the response to the authorization information browsing request.

The authorization information browsing process is thereby executed in the above-described manner. Note that the login manager 41 may set in advance a user group, obtain items of authorization information of all users in the group from the system processing unit 21, and include the items of authorization information in the processing result.

(f) Web Service Process

Figure 12:
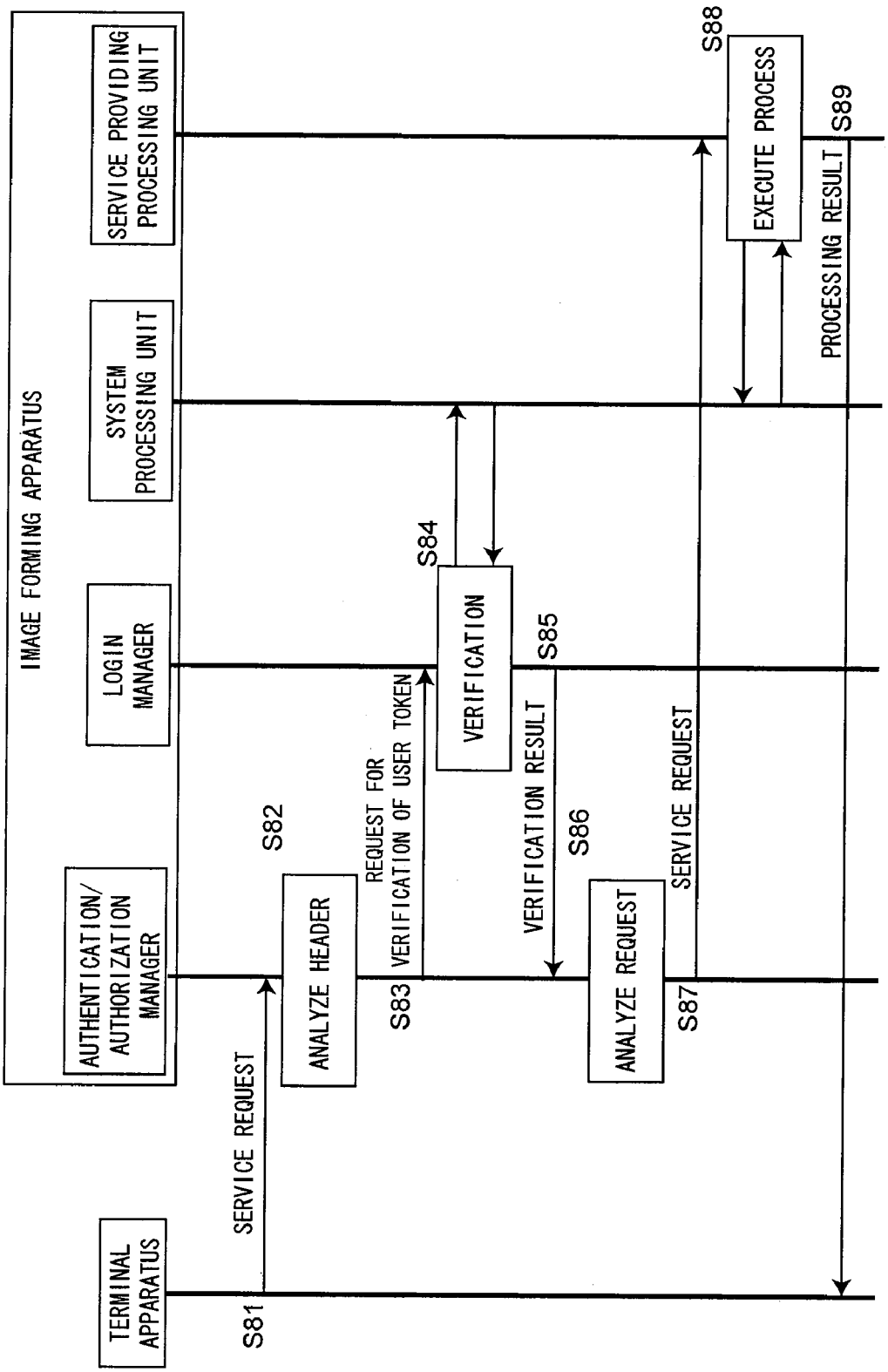
FIG. 12 is a chart illustrating a Web service process in the system shown in FIG. 1.

FIG. 12 is a chart illustrating an embodiment of a Web service process in the system shown in FIG. 1.

After the login process illustrated in FIG. 5 or 6, the terminal apparatus 2 sends a service request to the image forming apparatus 1 on the basis of a user operation or the like (step S81). The terminal apparatus 2 includes a user token in a SOAP header and sends a service request written in WSDL as a SOAP envelope. The image forming apparatus 1 receives the service request. In the image forming apparatus 1, the entities 31 through 36 execute processes in accordance with the respective protocols. The entity 36 extracts the security token or the binary security token from the SOAP header of the service request and supplies the extracted security token or binary security token to the authentication/authorization manager 42. The authentication/authorization manager 42 extracts a user token included in the security token or the binary security token (step S82) and supplies the extracted user token to the login manager 41 (step S83).

Upon receipt of the user token, the login manager 41 verifies the user token (step S84) and supplies the verification result to the authentication/authorization manager 42 (step S85). If the user token is valid, the authentication/authorization manager 42 analyzes the content of the SOAP body of the service request to specify a process designated in the service request (step S86) and requests the service providing processing unit 25 to execute that process (step S87). If the user token is invalid, the authentication/authorization manager 42 denies the service request and causes the network processing unit 22 to send a response indicating the denial. The user token is determined to be valid when the user token has been issued to the user who has logged in and stored at that point of time; if not, the user token is determined to be invalid.

On the basis of the request, the service providing processing unit 25 executes the designated process (step S88) and sends the processing result via the network processing unit 22 to the terminal apparatus 2 (step S89). At this time, the network processing unit 22 sends a response to the service request, which includes the processing result, as a SOAP envelope. The terminal apparatus 2 receives the response to the service request.

The Web service process can be executed in the above-described manner.

Note that, when authorization is required for the service providing processing unit 25 to use a feature of the system processing unit 21, the login manager 41 obtains in step S84 authorization information that can be obtained on the basis of the user token from the system processing unit 21. The login manager 41 supplies, together with the verification result, the authorization information to the authentication/authorization manager 42. The authentication/authorization manager 42 supplies, together with a request for execution of the process, the authorization information to the service providing processing unit 25. The service providing processing unit 25 presents the authorization information and uses the feature of the system processing unit 21.

As above, according to the foregoing embodiment, in the image forming apparatus 1, the network processing unit 22 performs data communication with the terminal apparatus 2 using predetermined protocols. When the user identification information received by the network processing unit 22 from the terminal apparatus 2 is valid, the login manager 41 permits the user to log in and sends to the terminal apparatus 2 a token with respect to the user who has logged in. When the network processing unit 22 receives a service request associated with the token, the authentication/authorization manager 42 determines whether the token is valid or not. Only if it is determined that the token is valid by the authentication/authorization manager 42, will the service providing processing unit 25 execute a process designated by the service request.

Accordingly, user authentication and authorization can be reliably performed in a system wherein a user uses the image forming apparatus 1 from the terminal apparatus 2 via the computer network.

According to the foregoing embodiment, the login manager 41 sends a user token as a security token of WS-Security, and the network processing unit 22 receives a service request in accordance with SOAP.

Therefore, when the user desires to use the image forming apparatus 1 from a remote location, the user can be reliably authorized on the basis of the security token with respect to every service request.

According to the foregoing embodiment, the login manager 41 sends a user token as a binary security token of WS-Security, and the network processing unit 22 receives a service request in accordance with SOAP.

Therefore, when the user desires to use the image forming apparatus 1 from a remote location, the user can be reliably authorized on the basis of the binary security token with respect to every service request.

Further, according to the foregoing embodiment, the image forming apparatus 1 includes the authentication processing unit 24. The authentication processing unit 24 queries the external authentication server as to whether user identification information received by the network processing unit 22 from the terminal apparatus 2 is valid or not, and receives the authentication result. The network processing unit 22 receives user identification information in accordance with SOAP. When it is determined that the user identification information received from the terminal apparatus 2 is valid, the login manager 41 permits the user to log in.

Accordingly, the user identification information is received in accordance with SOAP, and communication with the external authentication server is performed in accordance with a predetermined protocol. Therefore, communication between the terminal apparatus 2 and the image forming apparatus 1 need not depend on the protocol used by the external authentication server. Furthermore, since the security manager 23, which is independent of the system processing unit 21, can provide security which can be performed with the terminal apparatus 2 at a remote location and needed for user authentication, the system processing unit 21 can be used with very few modifications of the existing image forming apparatus 1.

Moreover, according to the foregoing embodiment, when the network processing unit 22 receives a logout request from the terminal apparatus 2, the login manager 41 permits the user to log out and then invalidates the token of the user who has logged out.

Therefore, no service request from a user who has not logged in is accepted. Accordingly, user authorization is correctly performed on every service request.

Furthermore, according to the foregoing embodiment, the image forming apparatus 1 includes the system processing unit 21. The system processing unit 21 controls and/or monitors the internal devices 13 for executing an image forming process. The service providing processing unit 25 utilizes the feature of the system processing unit 21, the use of which has been permitted by authorization of the user to whom the token has been issued, thereby executing a process designated by the service request.

Accordingly, access permission to the feature of the system processing unit 21 is additionally provided in the process in response to the service request from the user.

Note that, although the foregoing embodiment is an example of the present invention, the present invention is not limited thereto. Various modifications and changes can be made without departing from the scope of the present invention.

For example, in the foregoing embodiment, a user token is, for example, a value returned by a pseudo-random function or a value returned by a hash function that uses a random value or another value as a seed, such as Message Digest 5 (MD5) or Secure Hash Algorithm 1 (SHA1). Furthermore, a user token may include certificate information that certifies the issuer of the user token (namely, the image forming apparatus 1), such as a Kerberos ticket or an X.509v3 certificate.

In the foregoing embodiment, at the time of sending user identification information from the terminal apparatus 2 to the image forming apparatus 1, instead of sending the user ID as it is, a hash function value of the user ID, for example, may be sent as the user identification information.

In the foregoing embodiment, a user token is generated by the login manager 41. Alternatively, the external authentication server may generate a user token and supply the user token to the login manager 41. In such a situation, the login manager 41 may transfer the user token received from the terminal apparatus 2 to the external authentication server, and the external authentication server may verify the validity of the user token.

Moreover, in the foregoing embodiment, while security is provided before login using a security token or a binary security token, the terminal apparatus 2 obtains authentication scheme information of the image forming apparatus 1. Alternatively, an anonymous user who can only obtain the authentication scheme information of the image forming apparatus 1 may be set. In this case, a user first logs in as the anonymous user and obtains the authentication scheme information, and subsequently the user logs in as described above. Alternatively, the authentication scheme may be designated on the terminal apparatus 2 side. Or, the image forming apparatus 1 and the terminal apparatus 2 may perform an authentication process only using a specific authentication scheme designated in advance. In such a situation, it is not necessary for the terminal apparatus 2 or the image forming apparatus 1 to obtain authentication scheme information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system comprising:
a terminal apparatus;
an image forming apparatus that executes a process in response to a service request from the terminal apparatus;
wherein, the terminal apparatus is configured to (i) send user identification information with a login request to the image forming apparatus, (ii) receive from the image forming apparatus a token issued to a user who has logged into the image forming apparatus, and (iii) send the service request that includes the token written in Web Services Description Language (WSDL) as Simple Object Access Protocol (SOAP) envelop to the image forming apparatus; and
wherein, the image forming apparatus comprises: a network processing unit configured to perform data communication using the SOAP with the terminal apparatus, a login processing unit configured to (i) permit the user to log in when the user identification information received by the network processing unit from the terminal apparatus is valid user identification information and (ii) send the token to the terminal apparatus as at least one of a security token and a binary security token of Web Services Security in the SOAP envelop as a response to the login request, (iii) permit the user to log out when a logout request that includes the token written in the WSDL as the SOAP envelop is received by the network processing unit from the terminal apparatus, and (iv) invalidate the token of the user who has logged out, a determination unit configured to determine, when the network processing unit receives the service request that includes the token written in the WSDL as the SOAP envelop, whether the token is a valid token, and a service providing unit configured to execute the process designated by the service request when it is determined by the determination unit that the token is a valid token.

2. An image forming apparatus configured to execute a process in response to a service request from a terminal apparatus, comprising:
a network processing unit configured to perform data communication using SOAP with the terminal apparatus;
a login processing unit configured to (i) permit a user to log in when user identification information with a login request received by the network processing unit from the terminal apparatus is valid user identification information, (ii) send to the terminal apparatus a token for the user who has logged in as at least one of a security token and a binary security token of Web Services Security in the SOAP envelop as a response to the login request, (iii) permit the user to log out when a logout request that includes the token written in the WSDL as the SOAP envelop is received by the network processing unit from the terminal apparatus, and (iv) invalidate the token of the user who has logged out;
a determination unit that determines, when the network processing unit receives the service request that includes the token written in the WSDL as the SOAP envelop, whether the token is a valid token; and
a service providing unit that executes the process designated by the service request when it is determined by the determination unit that the token is a valid token.

3. The image forming apparatus according to claim 2, wherein the security token of Web Services Security is a UserNameToken element including identification information of a sender.

4. The image forming apparatus according to claim 3, wherein the identification information of the sender is selected from the group consisting of a Media Access Control (MAC) address of the image forming apparatus and information unique to a program in the terminal apparatus which executes a login process.

5. The image forming apparatus according to claim 4, wherein the information unique to the program in the terminal apparatus is selected from the group consisting of a utility program, an application program, and a driver program.

6. The image forming apparatus according to claim 2, wherein the binary security token of Web Services Security is a BinarySecurityToken element including certificate information of a sender.

7. The image forming apparatus according to claim 6, wherein the certificate information of the sender includes a certificate of the image forming apparatus.

8. The image forming apparatus according to claim 7, wherein the certificate of the image forming apparatus is selected from the group consisting of a Kerberos ticket and an X.509v3 certificate.

9. The image forming apparatus according to claim 2, wherein the token is a value selected from the group consisting of returned by a pseudo-random function, a random value, and a value returned by a hash function.

10. The image forming apparatus according to claim 9, wherein the hash function is selected from the group consisting of Message Digest 5(MD5) and Security Hash Algorithm 1(SHA1).

11. The image forming apparatus according to claim 2, further comprising an authentication processing unit that queries an external authentication server as to whether the user identification information received by the network processing unit from the terminal apparatus is valid user identification information, and receives an authentication result;
the network processing unit receives the user identification information in accordance with Simple Object Access Protocol(SOAP); and
the login processing unit permits the user to log in when, on the basis of the authentication result, the user identification information received from the terminal apparatus is valid user identification information.

12. The image forming apparatus according to claim 11, wherein the authentication processing unit is configured as an independent module.

13. The image forming apparatus according to claim 11, wherein an authentication protocol used by the authentication processing unit is selected from the group consisting of Kerberos, Lightweight Directory Access Protocol(LDAP), Windows NT LAN Manager authentication(NTLM) v1, and Windows NT LAN Manager authentication(NTLM) v2.

14. The image forming apparatus according to claim 2, further comprising a system processing unit that controls and/or monitors an internal device for executing an image forming process,
  wherein the service providing unit executes the process designated by the service request, using a feature of the system processing unit that has been permitted to use by authorization of the user to whom the token has been issued.

15. A method of executing a process by an image forming apparatus in response to a service request from a terminal apparatus, comprising:
  via the terminal apparatus,
  sending user identification information with a login request to the image forming apparatus;
  receiving from the image forming apparatus a token issued to a user who has logged into the image forming apparatus; and
  sending the service request that includes the token written in WSDL as SOAP envelop to the image forming apparatus,
  via the image forming apparatus,
  performing data communication using SOAP with the terminal apparatus;
  permitting a user to log in when the user identification information received from the terminal apparatus is valid user identification information;
  sending to the terminal apparatus the token for the user who has logged in as at least one of a security token and a binary security token of Web Services Security in the SOAP envelop as a response to the login request;
  permitting the user to log out when a logout request that includes the token written in the WSDL as the SOAP envelop is received from the terminal apparatus;
  invalidating the token of the user who has logged out;
  determining, when receiving the service request that includes the token written in the WSDL as the SOAP envelop, whether the token is a valid token; and
  executing the process designated by the service request when it is determined that the token is a valid token.

* * * * *